United States Patent
Park

(10) Patent No.: US 10,602,878 B2
(45) Date of Patent: Mar. 31, 2020

(54) HEATING COOKING UTENSIL HAVING EXCELLENT DURABILITY

(71) Applicant: THERMOLON KOREA CO., LTD., Busan (KR)

(72) Inventor: Chung Kwon Park, Busan (KR)

(73) Assignee: THERMOLON KOREA CO., LTD, Busan (KR)

( * ) Notice: Subject to any disclaimer, the term of this patent is extended or adjusted under 35 U.S.C. 154(b) by 347 days.

(21) Appl. No.: 15/523,833

(22) PCT Filed: Jul. 24, 2015

(86) PCT No.: PCT/KR2015/007735
§ 371 (c)(1),
(2) Date: May 2, 2017

(87) PCT Pub. No.: WO2016/076508
PCT Pub. Date: May 19, 2016

(65) Prior Publication Data
US 2017/0325627 A1 Nov. 16, 2017

(30) Foreign Application Priority Data
Nov. 12, 2014 (KR) .................. 10-2014-0157050

(51) Int. Cl.
| | | |
|---|---|---|
| A47J 36/02 | (2006.01) | |
| C04B 41/84 | (2006.01) | |
| A47J 37/10 | (2006.01) | |
| C04B 41/85 | (2006.01) | |
| A47J 27/00 | (2006.01) | |
| B32B 15/04 | (2006.01) | |
| B32B 18/00 | (2006.01) | |
| C09D 1/00 | (2006.01) | |

(52) U.S. Cl.
CPC .......... *A47J 36/025* (2013.01); *A47J 27/002* (2013.01); *A47J 37/10* (2013.01); *B32B 15/04* (2013.01); *B32B 18/00* (2013.01); *C04B 41/84* (2013.01); *C04B 41/85* (2013.01); *C09D 1/00* (2013.01)

(58) Field of Classification Search
CPC ........ A47J 27/002; A47J 36/025; A47J 37/10; B32B 15/04; B32B 18/00; C04B 41/84; C04B 41/85; C09D 1/00
See application file for complete search history.

(56) References Cited

U.S. PATENT DOCUMENTS

2012/0118168 A1* 5/2012 Park .................. A47J 36/02
99/324

FOREIGN PATENT DOCUMENTS

| JP | 2003-339547 A | 12/2003 |
|---|---|---|
| JP | 2010-042232 A | 2/2010 |

(Continued)

*Primary Examiner* — Yan Lan
(74) *Attorney, Agent, or Firm* — John K. Park; Park Law Firm

(57) ABSTRACT

The present invention relates to a heat-cooker having excellent durability wherein a silane compound-based transparent coating layer containing filler is formed on the external surface of a ceramic coating layer of a cooking surface of a heat-cooker. Compared to conventional porcelain enamel based heat-cookers, the cooking utensil of the present invention is lighter, and the transparent coating layer protects the ceramic coating layer to thereby improve durability and provide excellent non-stick characteristics.

5 Claims, 2 Drawing Sheets

(56) References Cited

FOREIGN PATENT DOCUMENTS

KR       20-0406966 Y1    1/2006
KR   10-2014-0109018 A    9/2014

* cited by examiner

[Fig. 1]
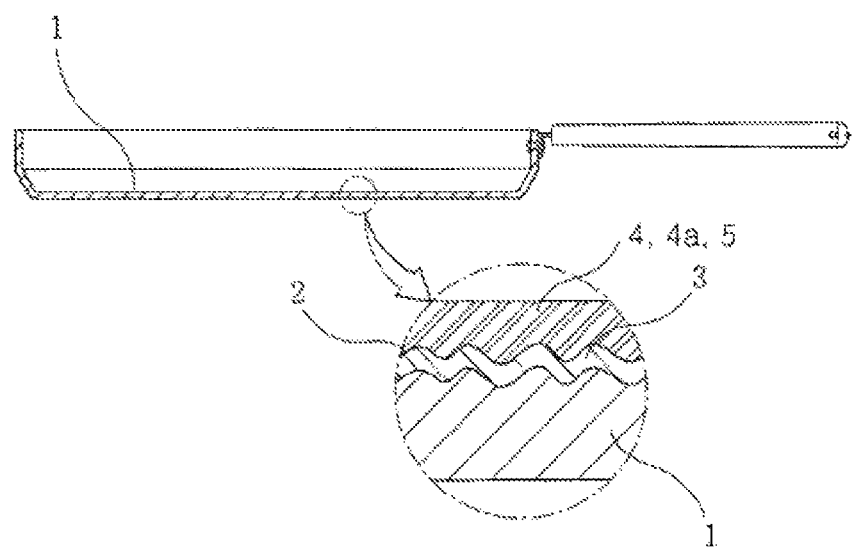
[Fig. 2]
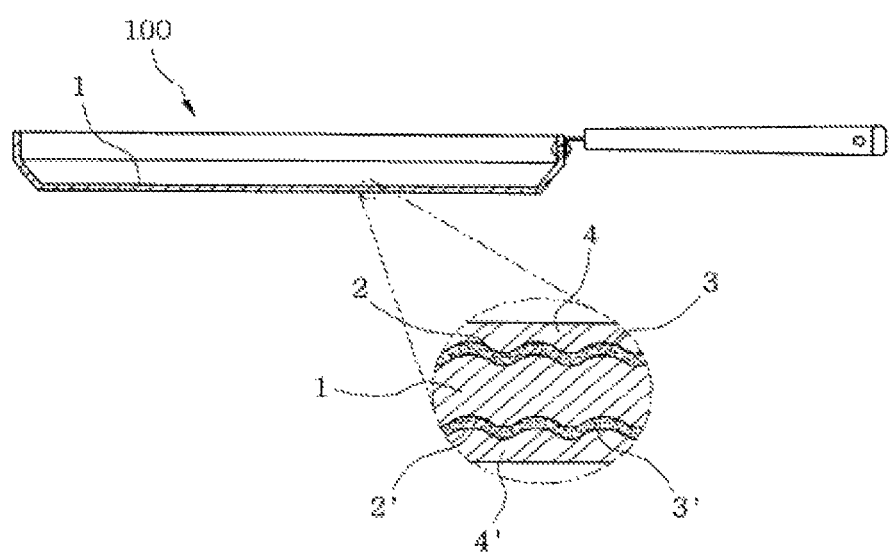

【Fig. 3】
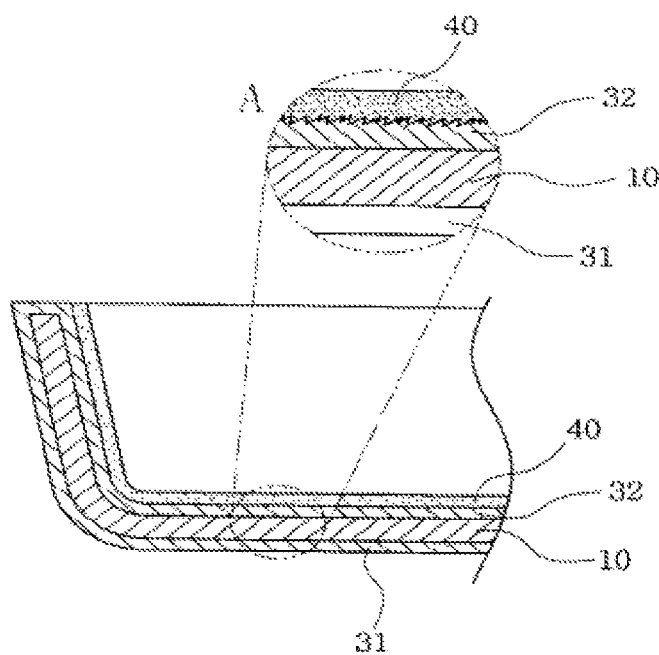
【Fig. 4】
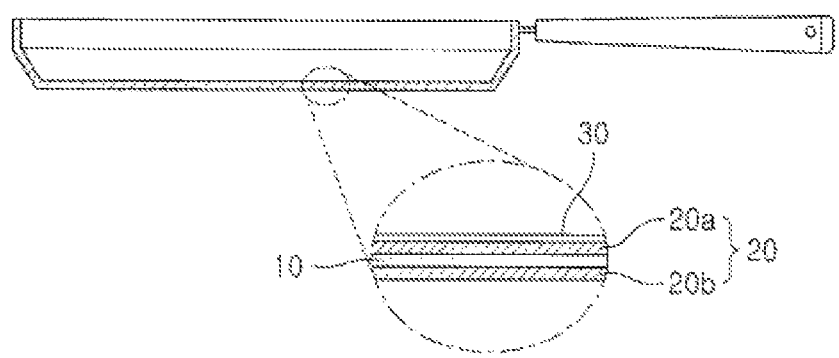

HEATING COOKING UTENSIL HAVING EXCELLENT DURABILITY

TECHNICAL FIELD

The present invention relates to a heat-cooker having excellent durability wherein a silane compound-based transparent coating layer containing a filler is formed on the outer surface of a ceramic coating layer of a cooking surface of the heat-cooker, so that the cooking utensil is relatively lightweight and the transparent coating layer protects the ceramic coating layer, thereby improving durability.

BACKGROUND ART

In general, a body of a heat-cooker such as a frying pan, a saucepan, or the like to which high-temperature heat is transmitted is manufactured using an iron and steel material, or an aluminum or stainless steel material. Various methods are researched and developed to improve the physical properties such as durability, heat resistance and the like of such a heat-cooker.

The applicant developed a ceramic coating composition for improving corrosion resistance, heat resistance and the like of an aluminum heat-cooker, and a patent relating to the ceramic coating composition has been granted registration. In addition, the applicant developed a heat-cooker coated with the ceramic coating composition, and a patent relating to a structure of a coating layer for the heat-cooker, which is disclosed in Korean Patent No. 10-765382 (registration date: Oct. 2, 2007), and a patent relating to a ceramic coated heat-cooker made of an iron and steel material and a manufacturing method thereof, which is disclosed in Korean Patent No. 10-0871877 (registration date: Nov. 27, 2008), have been granted registration. The heat-cookers of the above patent documents will be described hereinafter. As shown in FIG. 1, the heat-cooker made of an aluminum material, which is disclosed in Korean Patent No. 10-765382 (registration date: Oct. 2, 2007), is directed to a heat-cooker in which the outer surface of a body 1 made of an aluminum material of the coating layer structure for the heat-cooker is subjected to sandblastering to thereby form a corrugated pattern 2 thereon, the entire corrugated pattern 2 is subjected to anodizing (anodic oxidation) to thereby form an aluminum oxide film layer 3 thereon, and then a ceramic coating layer 4 is formed on the outer surface of the aluminum oxide film layer 3 so as to improve corrosion resistance, wear resistance, and the like. As shown in FIG. 2, the ceramic coated heat-cooker made of an iron and steel material, which is disclosed in Korean Patent No. 10-0871877 (registration date: Nov. 27, 2008), is directed to a heat-cooker in which corrugated patterns 2 and 2' are formed on the top surface and the underside of a body 1 made of an iron and steel material, respectively, conversion coating layers 3 and 3' are respectively formed on the underside and the top cooking surface of the corrugated patterns 2 and 2', and then ceramic coating layers 4 and 4' are formed on the outer surfaces of the conversion coating layers 3 and 3'.

The heat-cookers which were developed by the applicant and for which patents have been granted registration improve the physical properties such as corrosion resistance, wear resistance and the like, but encounter a problem in that the cooking surface of the ceramic coating layer frequently comes into close contact with a cooking utensil such as a spatula, a turner or the like while cooking foods in the long-term use of the heat-cookers to cause a damage to the ceramic coating layer, thereby leading to a deterioration in the chemical and mechanical properties such as corrosion resistance and wear resistance and thus an additional degradation in the non-stick characteristics.

Therefore, in an attempt to overcome the above problem, the applicant developed the ceramic coated heat-cooker made of an iron and steel material and the manufacturing method thereof, which is disclosed in Korean Patent No. 10-0871877 (registration date: Nov. 27, 2008), and a patent relating thereto has been granted registration. As shown in FIG. 3, the applicant developed an enameled heat-cooker having a non-stick ceramic coating layer, which is disclosed in Korean Patent No. 10-1104680 (registration date: Jan. 4, 2012) and in which lower and upper enamel layers 31 and 32 are formed on both surfaces of a body 10 made of an iron and steel material, respectively, and a non-stick ceramic coating layer 40 is formed on the upper enamel layer 32, and a patent relating thereto has been granted registration.

The enameled heat-cooker is significantly excellent in the chemical and mechanical properties such as corrosion resistance and wear resistance by virtue of the enamel layers and the ceramic coating layer, which are formed on the body of the enameled heat-cooker, but has a shortcoming in that the heat-cooker becomes heavyweight due to the enamel layers formed with a vitreous glaze, thus causing homemakers to suffer from an inconvenience in use.

DISCLOSURE OF INVENTION

Technical Problem

Accordingly, the present invention has been made in order to solve the above-described problems occurring in the prior art, and it is an object of the present invention is to provide a heat-cooker having excellent durability wherein a silane compound-based transparent coating layer containing a filler is formed on the external surface of a ceramic coating layer of a cooking surface of the heat-cooker, so that the cooking utensil is relatively lightweight compared to conventional enameled heat-cookers, and the transparent coating layer thereof protects the ceramic coating layer, thereby improving durability and exhibiting excellent non-stick characteristics.

Technical Solution

To achieve the above objects, the present invention provides a heat-cooker having excellent durability, including: a body made of an iron and steel material or an aluminum material; a ceramic coating layer formed on a cooking surface of the body; and a silane compound-based transparent coating layer formed on the outer surface of the ceramic coating layer of the cooking surface of the heat-cooker, the transparent coating layer containing a filler.

Further, in the present invention, a ceramic coating composition for forming the ceramic coating layer may include 100 parts by weight of an inorganic binding agent consisting essentially of 50-70% by weight of a silane compound and 30-50% by weight of a silica sol, 12-25 parts by weight of a functional filler, 6-20 parts by weight of a ceramic powder obtained by mixing a far infrared ray-radiating material and an anion-emitting material at a weight ratio of 1:1, and 2-18 parts by weight of a pigment.

In addition, in the present invention, the transparent coating composition for forming the transparent coating layer may include a mixture of 10-15 parts by weight of a functional filler and 0.1-5.0 parts by weight of mica or plate-shaped alumina particles, based on 100 parts by weight of an inorganic binding agent consisting essentially of 30-50% by weight of a silane compound and 50-70% by weight of a silica sol.

Advantageous Effects

The heat-cooker according to the present invention allows a silane compound-based transparent coating layer containing a filler to be formed on the outer surface of a ceramic coating layer of a cooking surface of the heat-cooker, so that the cooking utensil is excellent in corrosion resistance, wear resistance, heat resistance, etc., while being relatively lightweight compared to conventional enameled heat-cookers, thereby improving durability and exhibiting excellent non-stick characteristics.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 1 is a cross-sectional view illustrating a conventional heat-cooker made of an aluminum material and having a ceramic coating layer formed thereon;

FIG. 2 is a cross-sectional view illustrating a conventional heat-cooker made of an iron and steel material and having a ceramic coating layer formed thereon;

FIG. 3 is a cross-sectional view illustrating a conventional enameled heat-cooker having a ceramic coating layer formed thereon; and FIG. 4 is a cross-sectional view illustrating a heat-cooker having a transparent coating layer is applied as a finish coat according to the present invention.

BEST MODE FOR CARRYING OUT THE INVENTION

Hereinafter, a heat-cooker having excellent durability according to a preferred embodiment of the present invention will be described in further detail with reference to the accompanying drawings. It is to be noted that only portions necessary for understanding the technical constitution of the present invention will be described and the description of the remaining portions will be omitted to avoid obscuring the subject matter of the present invention. The thicknesses of lines or the sizes of constituent elements shown in the drawings may be exaggerated for clarity and convenience of the description.

The heat-cooker having excellent durability according to the present invention will be described hereinafter in detail with reference to FIG. 4.

The present invention is directed to a heat-cooker having excellent durability, in which a ceramic coating layer 20 is formed on a body 10 made of an iron and steel material or an aluminum material using an anion- and far infrared ray-emitting inorganic ceramic coating composition disclosed in Korean Patent No. 10-0512599 (registration date: Aug. 29, 2005) for which the applicant has been granted a registration.

In addition, the heat-cooker according to the present invention is characterized in that a silane compound-based transparent coating layer containing a filler is formed on the outer surface of a ceramic coating layer 20a formed on a portion corresponding to the cooking surface of the heat-cooker to protect a ceramic coating layer 20 formed on the outer surface of the body 10 of the heat-cooker.

Thus, the conventional anion- and far infrared ray-emitting inorganic ceramic coating composition disclosed in Korean Patent No. 10-0512599 (registration date: Aug. 29, 2005) or the heat-cooker disclosed in Korean Patent No. 10-765382 (registration date: Oct. 2, 2007) entail a problem in that the cooking surface of the ceramic coating layer frequently comes into close contact with a cooking utensil such as a spatula, a turner or the like while cooking foods to cause a damage to the ceramic coating layer. However, in an attempt to solve this problem, the present invention allows a silane compound-based transparent coating layer 30 containing a functional filler to be formed on the outer surface of a ceramic coating layer 20a to protect the ceramic coating layer 20a so that durability can be improved and non-stick characteristics can also be improved by the transparent coating layer 30. The ceramic coating layer 20 comprises of an outer surface coating layer 20a coated on a cooking surface of the body and an underside coating layer 20b coated on an underside of the body.

For reference, the phrase 'outer surface of the ceramic coating layer 20a' as used herein means a surface for cooking foods in the heat-cooker. In FIG. 4 of the accompanying drawings, a reference numeral 20a denotes an outer surface ceramic coating layer that is coated on the cooking surface of the body 10 of the heat-cooker, and a reference numeral 20b denotes an underside ceramic coating layer that is coated on the underside of the body 10 of the heat-cooker and is brought into close contact with a heating source.

In the present invention, the ceramic coating layer 20 formed on the outer surface of the body 10 of the heat-cooker is a coating layer that is formed to reinforce the mechanical and chemical properties such as corrosion resistance and heat resistance of the heat-cooker to protect the body 10 of the heat-cooker.

Hereinafter, a ceramic coating composition for forming the ceramic coating layer 20 will be described in detail.

The ceramic coating composition for forming the ceramic coating layer 20 includes 100 parts by weight of an inorganic binding agent consisting essentially of 50-70% by weight of a silane compound and 30-50% by weight of a silica sol, 12-25 parts by weight of a functional filler, 6-20 parts by weight of a ceramic powder obtained by mixing a far infrared ray-radiating material and an anion-emitting material at a weight ratio of 1:1, and 2-18 parts by weight of a pigment.

In the ceramic coating composition, the inorganic binding agent is attached to the body 10 made of a an iron and steel material or an aluminum material and functions to form a coating film of the ceramic coating layer to improve the mechanical and chemical properties such as heat resistance and corrosion resistance.

In addition, the silane compound as a component of the inorganic binding agent binds to the silica sol by a chemical reaction. If the mixing amount of the silane compound is out of the limited range, a layer peeling-off phenomenon may occur at high temperature due to a decrease in the bonding strength between the silane compound and the silica sol. Moreover, as the silane compound, it is preferable to use a silane having the formula $R_nSiX_{4-n}$, or an oligomer derived therefrom.

In the meantime, the silane compound uses one or more silanes having the formula $R_nSiX_{4-n}$, wherein each X is the same or different and is a hydrolyzable group or a hydroxyl group, the radicals R are the same or different and each represents a hydrogen atom or an alkyl group having 10 or less carbon atoms, and n is 0, 1 or 2.

More specifically, the silane compound that can be used in the present invention preferably is at least one selected from the group consisting of methyltrimethoxysilane, ethyltrimethoxysilane, normalpropyltrimethoxysilane, phenyltrimethoxysilane, vinyltrimethoxysilane, methyltriethoxysilane, ethyltriethoxysilane, normalpropyltriethoxysilane, phenylriethoxysilane, vinyltriethoxysilane, trifluoropropyltrimethoxysilane, tridecafluorooctyltrimethoxysilane, tetraethoxysilane, and heptadecafluorodecyltrimethoxysilane.

In addition, the silica sol binds to the silane compound by a chemical reaction by allowing amorphous silica particulates to form colloidal particulates in water. If the mixing amount of the silica sol is out of the limited range, the mechanical properties may be degraded due to a decrease in the bonding strength between the silane compound and the silica sol. Moreover, preferably, the silica sol is a mixture obtained by adding 60-80% by weight of water as a dispersion medium to 20-40% by weight of a powder silicon dioxide ($SiO_2$) having a particle size of from 0.2 to 1.0 μm, based on the total weight of the silica sol. If the contents of the powder silicon dioxide ($SiO_2$) and water are out of the above range, the amorphous silica particulates may not form colloidal particulates in water.

In the present invention, the functional filler as a component of the ceramic coating composition acts to improve the mechanical properties such as durability and heat resistance of the ceramic coating layer. If the mixing amount of the functional filler of the ceramic coating composition is less than the limited range, the mechanical properties such as durability and heat resistance will be degraded to decrease durability of the ceramic coating layer. On the contrary, if the mixing amount of the functional filler exceeds the limited range, the mixing amount of the components such as the inorganic binding agent or the ceramic powder will be relatively decreased compared to the mixing amount of the functional filler, and thus the ceramic coating layer will not be sufficiently formed, thus leading to a decrease in durability of the ceramic coating layer.

The functional filler comprises any one selected from the group consisting of zeolite, illite, sepiolite, bentonite, fumed silica, aerosil silica, silicon dioxide, and Binchotan charcoal, or a mixture of two or more thereof.

In the present invention, the ceramic powder acts to improve the mechanical properties of the coating film, and radiate far infrared rays and emit anions. If the mixing amount of the ceramic powder is less than the limited range, the far infrared ray-radiating and anion-emitting effects cannot be expected. Contrarily, if the mixing amount of the ceramic powder exceeds the limited range, the coating film will be changed in state and the adhesive strength of the coating film will be decreased. The far infrared ray-radiating material and the anion-emitting material of the ceramic powder are preferably mixed at a weight ratio of 1:1 in view of the amount of far infrared rays radiated and the amount of anions emitted. In the ceramic powder, the far infrared ray-radiating material that can be used in the present invention is preferably one or more selected from a group of natural mineral materials such as quartz, monzonite, gneiss, and rhyolitic tuff, which have a far infrared emissivity of more than 90% at 40° C., or a mixture of two or more thereof. The anion-emitting material preferably is any one rare-earth natural stone selected from the group consisting of strontium, vanadium, zirconium, cerium, neodymium, lanthanum, barium, rubidium, cesium, and gallium, or a mixture of two or more thereof.

In addition, the inorganic ceramic coating agent according to the present invention uses a pigment to express the color of the coating layer. Although the mixing amount of the pigment has been limited in the above description, it is necessarily not limited thereto depending on the color of the pigment or the demand of consumers or the need of manufacturers, but may be properly adjusted depending on the saturation and brightness of the pigment. In addition, the kind of the pigment is not particularly limited, but it may be appropriately selected from conventional pigments.

In the present invention, preferably, the thickness of the ceramic coating layer 20 formed on the body 10 of the cooking utensil is 20 to 100 μm, but may be out of the thickness range defined above depending on the demand of consumers or the need of manufacturers.

Meanwhile, in the present invention, the transparent coating layer 30 is formed on the outer surface of a portion corresponding to the cooking surface of the ceramic coating layer 20a coated on the outer side of the body 10 of the heat-cooker so as to protect the ceramic coating layer 20a. In addition, the transparent coating layer 30 is a coating layer that is endowed with the non-stick characteristics.

A transparent coating composition for forming the transparent coating layer includes a mixture of 10-15 parts by weight of a functional filler and 0.1-5.0 parts by weight of mica or plate-shaped alumina particles, based on 100 parts by weight of an inorganic binding agent consisting essentially of 30-50% by weight of a silane compound and 50-70% by weight of a silica sol.

The inorganic binding agent as a component of the transparent coating composition acts to form the transparent coating layer 30 on the outer surface of the ceramic coating layer 20a, and the inorganic binding agent has been described in detail in connection with the ceramic coating composition, and thus a detailed description thereof will be omitted to avoid redundancy.

In addition, the functional filler acts to improve the mechanical properties such as wear resistance and durability, and the functional filler has been described in detail in connection with the ceramic coating composition, and thus a detailed description thereof will be omitted to avoid redundancy.

Further, the mica or plate-shaped alumina particles used in the transparent coating composition are particles that are crushed finely and acts to exhibit the pearl effect in which the particles are dispersed to be given the "pearly" or "glitter" appearance in the transparent coating layer 30. If the mixing amount the mica or plate-shaped alumina particles is less than the limited range, the pearl effect of the transparent coating layer 30 will be degraded. On the contrary, if the mixing amount the mica or plate-shaped alumina particles exceeds the limited range, the mica or plate-shaped alumina particles will be dispersed in a large amount in the in the transparent coating layer 30, thus rather than leading to a risk of offsetting the pearl effect of the transparent coating layer 30. The size of the mica or plate-shaped alumina particles is preferably 10-50 μm, but may be out of the limited range depending on the need of manufacturers or the demand of consumers.

In addition, in the present invention, the thickness of the transparent coating layer 30 coated on the outer cooking surface of the ceramic coating layer 20a is preferably 20-100 μm, but may be out of the limited range depending on the need of manufacturers or the demand of consumers.

The heat-cooker according to the present invention as described above allows a silane compound-based transparent coating layer containing a filler to be formed on the outer surface of a ceramic coating layer of a cooking surface of the heat-cooker, so that the cooking utensil is excellent in corrosion resistance, wear resistance, heat resistance, etc., while being relatively lightweight compared to conventional enameled heat-cookers, thereby improving durability and exhibiting excellent non-stick characteristics.

Now, the heat-cooker having excellent durability according to the present invention will be described in more detail by way of examples. It should be appreciated that the scope of the invention is not limited by only the examples.

1. Preparation of Ceramic Coating Composition

PREPARATION EXAMPLE 1

The ceramic coating composition was prepared by mixing 100 parts by weight of an inorganic binding agent, 12 parts by weight of a functional filler, 6 parts by weight of a ceramic powder, and 2 parts by weight of a black-colored pigment. The inorganic binding agent used in Preparation Example 1 consisted essentially of 50% by weight of a silane compound and 50% by weight of a silica sol. The silane compound used in Preparation Example 1 was methyltrimethoxysilane, and the silica sol used in Preparation Example 1 was a mixture of 60% by weight of water and 40% by weight of a powder silicon dioxide having a particle size of from 0.2 to 1.0 µm. In addition, the functional filler used in Preparation Example 1 was a mixture of zeolite and illite mixed at a weight ratio of 1:1, and the ceramic powder used in Preparation Example 1 was a powder obtained by mixing quartz and monzonite as far infrared ray-radiating materials, and vanadium as an anion-emitting material at a weight ratio of 1:1:1.

PREPARATION EXAMPLE 2

The ceramic coating composition was prepared by mixing 100 parts by weight of an inorganic binding agent, 25 parts by weight of a functional filler, 20 parts by weight of a ceramic powder, and 18 parts by weight of a black-colored pigment. The inorganic binding agent used in Preparation Example 1 consisted essentially of 30% by weight of a silane compound and 70% by weight of a silica sol. The silane compound used in Preparation Example 1 was methyltrimethoxysilane, and the silica sol used in Preparation Example 1 was a mixture of 80% by weight of water and 20% by weight of a powder silicon dioxide having a particle size of from 0.2 to 1.0 µm. In addition, the functional filler used in Preparation Example 1 was a mixture of zeolite and illite mixed at a weight ratio of 1:1, and the ceramic powder used in Preparation Example 1 was a powder obtained by mixing quartz and monzonite as far infrared ray-radiating materials, and vanadium as an anion-emitting material at a weight ratio of 1:1:1.

2. Preparation of Transparent Coating Composition

PREPARATION EXAMPLE 3

The transparent coating composition was prepared by mixing 10 parts by weight of a functional filler and 0.1 parts by weight of mica having a particle size of 10 µm, based on 100 parts by weight of an inorganic binding agent consisting essentially of 30% by weight of a silane compound and 70% by weight of a silica sol. The inorganic binding agent and the functional filler used in Preparation Example 3 were prepared in the same manner as in Preparation Example 1, respectively.

PREPARATION EXAMPLE 4

The transparent coating composition was prepared by mixing 15 parts by weight of a functional filler and 5.0 parts by weight of mica having a particle size of 10 µm, based on 100 parts by weight of an inorganic binding agent consisting essentially of 50% by weight of a silane compound and 50% by weight of a silica sol. The inorganic binding agent and the functional filler used in Preparation Example 3 were prepared in the same manner as in Preparation Example 1, respectively.

3. Manufacture of Heat-cooker having Excellent Durability

EXAMPLE 1

The ceramic coating composition prepared by a method of Preparation Example 1 was coated to a thickness of 60 µm on the outer surface of the body 10 made of an iron and steel material of the heat-cooker having the structure as shown in FIG. 4, and then heated at a temperature of 270° C. for 15 minutes to thereby form a ceramic coating layer 20. Thereafter, the transparent coating composition prepared by a method of Preparation Example 3 was coated to a thickness of 20 µm on the outer surface of the ceramic coating layer 20a, which corresponds to the cooking surface of the cooking utensil, and then heated at a temperature of 270° C. for 15 minutes to thereby form a transparent coating layer 30, thereby manufacturing the heat-cooker.

EXAMPLE 2

The ceramic coating composition prepared by a method of Preparation Example 1 was coated to a thickness of 60 µm on the outer surface of the body 10 made of an iron and steel material of the heat-cooker having the structure as shown in FIG. 4, and then heated at a temperature of 270° C. for 15 minutes to thereby form a ceramic coating layer 20. Thereafter, the transparent coating composition prepared by a method of Preparation Example 4 was coated to a thickness of 20 µm on the outer surface of the ceramic coating layer 20a, which corresponds to the cooking surface of the cooking utensil, and then heated at a temperature of 270° C. for 15 minutes to thereby form a transparent coating layer 30, thereby manufacturing the heat-cooker.

EXAMPLE 3

The ceramic coating composition prepared by a method of Preparation Example 2 was coated to a thickness of 60 µm on the outer surface of the body 10 made of an iron and steel material of the heat-cooker having the structure as shown in FIG. 4, and then heated at a temperature of 270° C. for 15 minutes to thereby form a ceramic coating layer 20. Thereafter, the transparent coating composition prepared by a method of Preparation Example 3 was coated to a thickness of 20 µm on the outer surface of the ceramic coating layer 20a, which corresponds to the cooking surface of the cooking utensil, and then heated at a temperature of 270° C. for 15 minutes to thereby form a transparent coating layer 30, thereby manufacturing the heat-cooker.

EXAMPLE 4

The ceramic coating composition prepared by a method of Preparation Example 2 was coated to a thickness of 60 µm on the outer surface of the body 10 made of an iron and steel material of the heat-cooker having the structure as shown in FIG. 4, and then heated at a temperature of 270° C. for 15 minutes to thereby form a ceramic coating layer 20. Thereafter, the transparent coating composition prepared by a method of Preparation Example 4 was coated to a thickness of 20 μm on the outer surface of the ceramic coating layer 20a, which corresponds to the cooking surface of the cooking utensil, and then heated at a temperature of 270° C. for 15 minutes to thereby form a transparent coating layer 30, thereby manufacturing the heat-cooker.

COMPARATIVE EXAMPLE 1

The ceramic coating composition prepared by a method of Preparation Example 1 was coated to a thickness of 60 μm on the outer surface of the body 10 made of an iron and steel material of the heat-cooker, and then heated at a temperature of 270° C. for 15 minutes to thereby form a ceramic coating layer 20, thereby manufacturing the heat-cooker.

COMPARATIVE EXAMPLE 2

The ceramic coating composition prepared by a method of Preparation Example 2 was coated to a thickness of 60 μm on the outer surface of the body 10 made of an iron and steel material of the heat-cooker, and then heated at a temperature of 270° C. for 15 minutes to thereby form a ceramic coating layer 20, thereby manufacturing the heat-cooker.

4. Evaluation of Heat-cooker

An evaluation was made on the heat-cookers manufactured by the method of Examples 1 to 4, and Comparative Examples 1 and 2 in terms of the following items: impact resistance, heat resistance, corrosion resistance, and non-stick characteristics.

4.1 Impact Resistance Test

The impact resistance test was performed to visually observe the cracking state of the coating layer film of the heat-cooker after dropping a 200±1 g steel ball from a height of 25 cm onto a ceramic-coated iron and steel material according to the method of KS D 6711.

As a result of performing the impact resistance test on the heat-cookers manufactured by the methods of Examples 1 to 4, and Comparative Examples 1 and 2, no cracking or peeling-off phenomenon was found in the coating layers of all the heat-cookers manufactured by the methods of Examples 1 to 4, and Comparative Examples 1 and 2.

4.2 Heat Resistance Test

The heat resistance test was performed to visually observe the cracking state of the coating layer film of the heat-cooker after heating the heat-cooker at a temperature of 250° C. for 24 hours according to the method of JIS K 5400.

As a result of performing the heat resistance test on the heat-cookers manufactured by the methods of Examples 1 to 4, and Comparative Examples 1 and 2, no cracking or peeling-off phenomenon was found in the coating layer films of all the heat-cookers manufactured by the methods of Examples 1 to 4, and Comparative Examples 1 and 2.

4.3 Corrosion Resistance Test

The corrosion resistance test was performed to visually observe the corrosion state of the coating layer film of the heat-cooker after immersing the heat-cooker in a 5% $H_2SO_4$ solution for 720 hours and then taking the heat-cooker out of the solution according to the method of JIS K 5400.

As a result of performing the corrosion resistance test on the heat-cookers manufactured by the methods of Examples 1 to 4, and Comparative Examples 1 and 2, no corrosion phenomenon was found in the coating layer films of all the heat-cookers manufactured by the methods of Examples 1 to 4, and Comparative Examples 1 and 2.

4.4 Evaluation of Non-Stick Characteristics

The non-stick characteristics evaluation was performed to visually observe a degree in which the yolk and the white of a broken egg adhere to the cooking surface after allowing the broken egg to stand for 2 minutes on the cooking surface when the surface temperature of the cooking surface reaches 150° C. after heating the heat-cooker using an electrical hot plate.

The evaluation of the non-stick characteristics was performed in such a manner that five scores are assigned when the egg is removed from the cooking surface, four scores are assigned when 10% or less of the egg adheres to the cooking surface, three scores are assigned when 25% or less of the egg adheres to the cooking surface, two scores are assigned when 50% or less of the egg adheres to the cooking surface, and one scores is assigned when 75% or more of the egg adheres to the cooking surface.

In the evaluation of the non-stick characteristics, average values obtained by performing the evaluation 10 times were estimated into integers. As a result of the estimation of the average values, the heat-cookers manufactured by the method of Examples 1 to 4 was evaluated as being assigned five scores whereas the heat-cookers manufactured by the method of Comparative Examples 1 and 2 was evaluated as being assigned 3 scores.

As a result of the evaluation of the heat-cookers manufactured by the method of Examples 1 to 4, and Comparative Examples 1 and 2 in terms of impact resistance, heat resistance, corrosion resistance, and non-stick characteristics, it could be found that the mechanical and chemical properties such as impact resistance, heat resistance, and corrosion resistance of the transparent coating layer 30 coated on the cooking surface of the heat-cookers of Examples 1 to 4 were identical to those of the ceramic coating layer 20 of the heat-cookers of Comparative Examples 1 and 2, but the heat-cookers of Examples 1 to 4 were superior to the heat-cookers of Comparative Examples 1 and 2 in terms of non-stick durability.

Therefore, only the ceramic coating layer 20 is formed in the heat-cookers of Comparative Examples 1 and 2 whereas the transparent coating layer 30 is additionally formed on the outer surface of the ceramic coating layer 20a to protect the cooking surface of the ceramic coating layer 20a in the heat-cookers of Examples 1 to 4 so that the heat-cookers of Examples 1 to 4 can be estimated to be more excellent in durability than those of Comparative Examples 1 and 2.

While the heat-cooker having excellent durability according to the preferred embodiments of the present invention has been described and illustrated in connection with specific exemplary embodiments with reference to the accompanying drawings, it will be readily appreciated by those skilled in the art that it is merely illustrative of the preferred embodiments of the present invention and various modifications and changes can be made thereto within the technical spirit and scope of the present invention.

BEST MODE

The present invention includes a body made of an iron and steel material or an aluminum material and a ceramic coating layer formed on a cooking surface of the body. A silane compound-based transparent coating layer containing a filler is formed on the outer surface of the ceramic coating layer of the cooking surface of the heat-cooker, the transparent coating layer.

In addition, a ceramic coating composition for forming the ceramic coating layer preferably includes 100 parts by weight of an inorganic binding agent consisting essentially of 50-70% by weight of a silane compound and 30-50% by weight of a silica sol, 12-25 parts by weight of a functional filler, 6-20 parts by weight of a ceramic powder obtained by mixing a far infrared ray-radiating material and an anion-emitting material at a weight ratio of 1:1, and 2-18 parts by weight of a pigment.

Further, a transparent coating composition for forming the transparent coating layer preferably includes a mixture of 10-15 parts by weight of a functional filler and 0.1-5.0 parts by weight of mica or plate-shaped alumina particles, based on 100 parts by weight of an inorganic binding agent consisting essentially of 30-50% by weight of a silane compound and 50-70% by weight of a silica sol.

INDUSTRIAL APPLICABILITY

The heat-cooker according to the present invention allows a silane compound-based transparent coating layer containing a filler to be formed on the outer surface of a ceramic coating layer of a cooking surface of the heat-cooker, so that the cooking utensil is excellent in corrosion resistance, wear resistance, heat resistance, etc., while being relatively light-weight compared to conventional enameled heat-cookers, thereby improving durability and exhibiting excellent non-stick characteristics. Therefore, the heat-cooker according to the present invention is expected to be widely used in industrial applications.

The invention claimed is:

1. A heat-cooker having excellent durability, comprising:
a body made of an iron and steel material or an aluminum material;
a ceramic coating layer formed on a cooking surface of the body, wherein the ceramic coating layer comprises of an outer surface ceramic coating layer coated on a cooking surface of the body and an underside ceramic coating layer coated on an underside of the body;
a silane compound-based transparent coating layer formed on the outer surface coating layer, wherein the transparent coating layer containing a filler;
a ceramic coating composition for forming the ceramic coating layer comprises 100 parts by weight of an inorganic binding agent consisting essentially of 50-70% by weight of a silane compound and 30-50% by weight of a silica sol, 12-25 parts by weight of a functional filler, 6-20 parts by weight of a ceramic powder obtained by mixing a far infrared ray-radiating material and an anion-emitting material at a weight ratio of 1:1, and 2-18 parts by weight of a pigment; and
a transparent coating composition for forming the transparent coating layer comprises a mixture of 10-15 parts by weight of a functional filler and 0.1-5.0 parts by weight of mica or plate-shaped alumina particles, based on 100 parts by weight of an inorganic binding agent consisting essentially of 30-50% by weight of a silane compound and 50-70% by weight of a silica sol, and wherein the silica sol is a mixture obtained by adding 60 to 80% by weight of water to 20 to 40% by weight of a powder silicon dioxide ($SiO_2$) having a particle size of from 0.2 to 1.0 μm.

2. The heat-cooker according to claim 1, wherein the silane compound uses one or more silanes having the formula $R_nSiX_{4-n}$ wherein each X is the same or different and is a hydrolyzable group or a hydroxyl group, the radicals R are the same or different and each represents a hydrogen atom or an alkyl group having 10 or less carbon atoms, and n is 0, 1 or 2.

3. The heat-cooker according to claim 2, wherein the functional filler comprises any one selected from the group consisting of zeolite, illite, sepiolite, bentonite, fumed silica, aerosil silica, silicon dioxide, and Binchotan charcoal, or a mixture of two or more thereof.

4. The heat-cooker according to claim 3, wherein the ceramic powder is a mixture of the anion-emitting material and the far infrared ray-radiating material mixed at a weight ratio of 1:1 in such a manner as to select one or more selected from the group consisting of quartz, monzonite, gneiss, and rhyolitic tuff, which are far infrared ray-radiating materials, and one or more selected from the group consisting of strontium, vanadium, zirconium, cerium, neodymium, lanthanum, barium, rubidium, cesium, and gallium, which are anion-emitting materials.

5. The heat-cooker according to claim 4, wherein the silica sol is a mixture obtained by adding 60 to 80% by weight of water to 20 to 40% by weight of a powder silicon dioxide ($SiO_2$) having a particle size of from 0.2 to 1.0 μm.

* * * * *